United States Patent
Epstein

(10) Patent No.: US 6,944,771 B2
(45) Date of Patent: Sep. 13, 2005

(54) METHOD AND APPARATUS FOR OVERCOMING A WATERMARK SECURITY SYSTEM

(75) Inventor: Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 269 days.

(21) Appl. No.: 10/024,773

(22) Filed: Dec. 20, 2001

(65) Prior Publication Data

US 2003/0120946 A1 Jun. 26, 2003

(51) Int. Cl.$^7$ .................................................. H04L 9/00
(52) U.S. Cl. .................... 713/200; 713/176; 713/201; 380/201; 380/202; 380/203; 380/204; 380/221; 380/229; 380/255; 380/28; 382/164; 382/173; 382/190; 382/232; 382/254; 705/51
(58) Field of Search ................................ 713/200, 201, 713/176; 380/201–204, 221, 229, 255, 28

(56) References Cited

U.S. PATENT DOCUMENTS

| | | | | |
|---|---|---|---|---|
| 4,228,348 A | * | 10/1980 | Lee | 235/449 |
| 5,598,526 A | * | 1/1997 | Daniel et al. | 345/540 |
| 5,636,362 A | * | 6/1997 | Stone et al. | 711/129 |
| 5,666,412 A | * | 9/1997 | Handelman et al. | 380/229 |
| 5,734,811 A | * | 3/1998 | Croslin | 714/4 |
| 5,825,892 A | * | 10/1998 | Braudaway et al. | 380/51 |
| 5,915,027 A | * | 6/1999 | Cox et al. | 380/54 |
| 6,104,826 A | * | 8/2000 | Nakagawa et al. | 382/100 |
| 6,219,634 B1 | * | 4/2001 | Levine | 704/200.1 |
| 6,256,736 B1 | * | 7/2001 | Coppersmith et al. | 713/176 |
| 6,272,634 B1 | * | 8/2001 | Tewfik et al. | 713/176 |
| 6,282,299 B1 | * | 8/2001 | Tewfik et al. | 382/100 |
| 6,411,725 B1 | * | 6/2002 | Rhoads | 382/100 |
| 6,546,397 B1 | * | 4/2003 | Rempell | 707/102 |
| 6,631,198 B1 | * | 10/2003 | Hannigan et al. | 382/100 |
| 6,633,654 B2 | * | 10/2003 | Hannigan et al. | 382/100 |

(Continued)

FOREIGN PATENT DOCUMENTS

| | | | | |
|---|---|---|---|---|
| EP | 1215624 | * of 2002 | | 365/201 |
| WO | WO 01362/0 B | * 12/1888 | | H04N/7/24 |

OTHER PUBLICATIONS

Garofalakis et al, Digital Data Processing for intellectual Property Rights Preservation Over World Wide Web, 1977, IEEE, pp. 833–836.*

(Continued)

Primary Examiner—Ayaz Sheikh
Assistant Examiner—Aravind K Moorthy
(74) Attorney, Agent, or Firm—Dicran Halajian

(57) ABSTRACT

To overcome a watermark security system that is based on a limited set of possible watermark values, a collection of authentic watermarked material is created, and a substitution system provides material from this collection in lieu of the content material that the watermark verification system is intended to verify. In security systems that are designed to verify the existence of authentic watermarked material, without regard to the actual content of the material, this substitution scheme will be successful. In security systems that are designed to verify the existence of an entirety of a data set in order to authorize the presentation of select material from the data set, the substitution of authentic watermarked material for the non-selected material will also be successful. A dictionary of expected watermarks for the data set is provided. When the security system requests the watermarked segments of the selected material, the selected material is presented; when the security system requests watermarked segments of the non-selected material, the dictionary of expected watermarks is accessed, and the appropriate authentic watermarked material is presented from the stored collection.

26 Claims, 1 Drawing Sheet

U.S. PATENT DOCUMENTS

| | | | | |
|---|---|---|---|---|
| 6,674,876 | B1 * | 1/2004 | Hannigan et al. | 382/100 |
| 6,728,408 | B1 * | 4/2004 | Echizen et al. | 382/232 |
| 6,728,414 | B1 * | 4/2004 | Chang et al. | 382/254 |
| 6,751,359 | B1 * | 6/2004 | Handley | 382/260 |
| 6,766,056 | B1 * | 7/2004 | Huang et al. | 382/190 |
| 6,771,812 | B1 * | 8/2004 | Ikenoue | 382/164 |
| 6,785,815 | B1 * | 8/2004 | Serret-Avila et al. | 713/176 |
| 6,836,549 | B1 * | 12/2004 | Quan et al. | 380/221 |
| 6,839,462 | B1 * | 1/2005 | Kitney et al. | 382/173 |
| 6,850,619 | B1 * | 2/2005 | Hirai | 380/203 |
| 6,853,726 | B1 * | 2/2005 | Moskowitz et al. | 380/28 |
| 6,859,790 | B1 * | 2/2005 | Nonaka et al. | 705/51 |
| 6,885,748 | B1 * | 4/2005 | Wang | 380/201 |

OTHER PUBLICATIONS

Arnold, Michael, Computer Science; Digital Data provide invisible proof of copyright, Mar. 2003, Science Letter, p. 19.*

Mobasseri, Bijan, Direct Sequence watermarking of Digital Video using m–frames, 1998, IEEE, pp. 399–403.*

Thanos et al, Broadcasting Copyrighted Video, 2002, Broadcasting Engineering, pp. 6–7.*

Mizrachi et al, Parameter Identification of a Classof Nonlinear Systems for Robust Audio Watermarking Verification, 2002, IEEE, pp. 13–15.*

US 000040 filed on Mar. 28, 2000, Ser. No. 09/5436,944, Inventors: Antonius A. Staring et al., Entitled: Protecting Content Form Illicit Reproduction by Proof of Existence of a Complete Data Set via Self–Referencing Sections.

Craver et al: "Reading between the lines: Lessons from the SDMI challenge" PRoceedings of the USenix Security Symposium, Aug. 13, 2001, pp. 1–12.

Kirovski et al: "Replacement attack on arbitrary watermark systems" 2002 IEEE International Conference on Acoustics, Speech, and signal processing. Proceedings. ((IGASSP), May 18, 2002, vol. 4 of 4, pp IV3740–IV3743.

* cited by examiner

METHOD AND APPARATUS FOR OVERCOMING A WATERMARK SECURITY SYSTEM

BACKGROUND OF THE INVENTION

1. Field of the Invention

This invention relates to the field of security, and in particular to providing access to copy-protected content material.

2. Description of Related Art

The protection of data is becoming an increasingly important area of security. In many situations, the authority to copy or otherwise process information is verified by evaluating the encoding of copy-protected material for particular characteristics. For example, copy-protected material may contain watermarks or other encodings that identify the material as being copy-protected, and also contains other encodings that identify whether this particular copy of the material is an authorized copy, and whether it can be copied again. For example, content material may be "watermarked" by an additional encoding process that adds a watermark that is not noticeable when the content material is being rendered in its appropriate form, but is detectable by a watermark detection process. Attempting to remove the watermark causes damage to the content material. When a watermark is detected, the content material is further evaluated to determine whether it is an authorized copy.

To assure that the content material is truly authorized, and that illicit content material has not been substituted for material that is authorized, the content material is often 'bound' to the parameter that is used to determine the authorization. For example, the authorization parameter may correspond to a hash value that is derived from the content material. To verify that the authorization corresponds to the proffered content material, a hash value of the proffered content material is determined, and compared to the original hash value contained in the authorization parameter. If the hash values do not match, further rendering of the content material ceases. Because the determination of a set of values that will produce a particular hash value is virtually impossible, in a cryptology sense, the comparison of hash values is commonly accepted as 'proof' that the original material and the proffered material are equivalent.

For large data sets, the data is partitioned into segments, and each segment is bound to an identifier that is used to determine the authorization to access the particular segment of the data set. To assure that each segment is bound to the data set, the identifier typically includes a common parameter, such as a data set identification number, that is associated with the particular data set.

Generally, the bandwidth available for encoding information into a watermark is extremely limited. A bandwidth of one bit per second of watermark is not uncommon. As such, the number of bits available for encoding identifiers of segments and/or data sets is limited. For example, a typical segment of a CD is approximately fifteen seconds in duration. Thus, the identifier that is bound to each segment is limited to approximately fifteen bits. Increasing the length of each CD segment will increase the number of bits available for encoding in the watermark, but in any event, the number of unique identifiers of segments of a CD, or other media, will be finite.

BRIEF SUMMARY OF THE INVENTION

It is an object of this invention to disclose a method and apparatus for overcoming a security system that is limited by a finite number of unique identifiers. In particular, it is an object of this invention to disclose a method and apparatus that is configured to overcome a watermarking system having a limited information-carrying bandwidth.

These objects and others are achieved by creating a collection of authentic watermarked material, and providing a system that substitutes the authentic watermarked material to a watermark verification system in lieu of the content material that the watermark verification system is intended to verify. In security systems that are designed to verify the existence of authentic watermarked material, without regard to the actual content of the material, this substitution scheme will be successful. In security systems that are designed to verify the existence of an entirety of a data set in order to authorize the presentation of select material from the data set, the substitution of authentic watermarked material for the non-selected material will also be successful. A dictionary of expected watermarks for the data set is provided. When the security system requests the watermarked segments of the selected material, the selected material is presented; when the security system requests watermarked segments of the non-selected material, the dictionary of expected watermarks is accessed, and the appropriate authentic watermarked material is presented from the stored collection.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
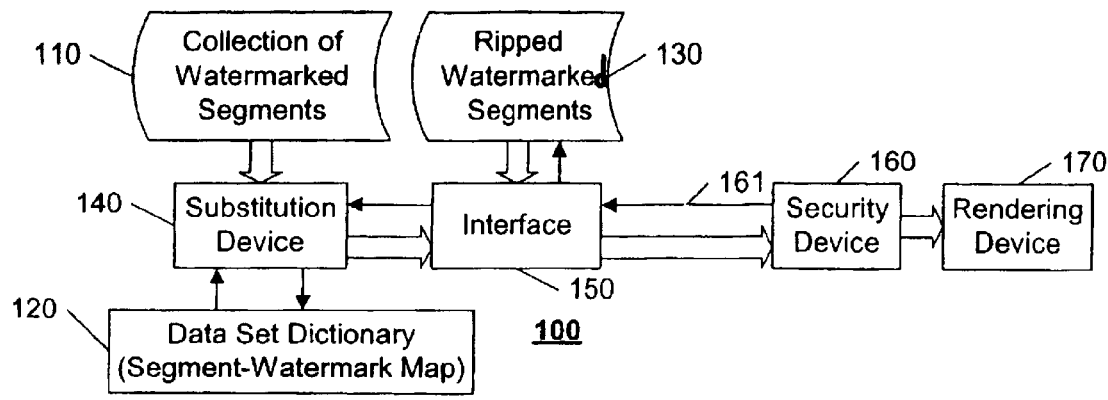
FIG. 1 illustrates an example block diagram of a system that is configured to overcome a security procedure based on watermarks, in accordance with this invention.

For ease of reference and understanding, this invention is presented hereinafter in the context of a copy-protected CD that is organized into finite-length segments, although the principles of this invention are not limited to this particular media.

Copending U.S. patent application "Protecting Content from Illicit Reproduction by Proof of Existence of a Complete Data Set via Self-Referencing Sections", U.S. Ser. No. 09/536,944, filed Mar. 28, 2000 for Antonius A. M. Staring, Michael A. Epstein, and Martin Rosner, incorporated by reference herein, addresses the illicit distribution of select content material from a collection of copy protected content material. Often, a song is 'ripped' from a CD and illicitly made available for distribution via the Internet. Each subsequent download of the song deprives the owner of the copyrights to the song of rightful royalties. A premise of this copending patent application is that the downloading of a song will be discouraged if the user is required to also download the entire contents of the CD. That is, due to bandwidth limitations and other factors, the illicit download of an entire CD is deemed to be substantially less likely than the illicit download of an individual song.

To verify that an entirety of the collection of content material is present when a particular song is presented for rendering, a compliant rendering device accesses other segments of the collection, to verify their presence. To assure that these other sections belong to the same CD, an identifier in the watermark of each segment of the CD is bound to the segment.

As noted above, the bandwidth available for encoding information into a watermark is extremely limited, and the information-carrying capability of a typical watermark for a CD segment is limited to under twenty bits. Increasing the length of each CD segment will increase the number of bits available for encoding in the watermark, but in any event, the number of unique identifiers of segments of a CD, or other media, will be finite.

This invention is premised on the observation that, given the finite number of bits available for binding the watermark to the content material, it is feasible to create a collection of most, if not all, possible watermark values, with corresponding bound segments. This collection of authentic watermarked material may be the result of any of a variety of data collection and organizing efforts, such as an organized effort among a variety of illicit providers, or merely a categorization of segments of content material that a user has previously downloaded.

The invention is also premised on the observation that it is also feasible to determine the watermark value of each segment of a given CD. That is, given a watermark detector, common in the art, the watermark value of each segment of a CD can be read from an original, authorized, version of the CD. The list of watermarks for each CD can be widely, and legally, distributed. Specifically, the list of watermarks corresponding to each segment of a CD can be easily downloaded, without downloading the entirety of the contents of the CD.

If the watermarks cannot be easily read, a trial an error method can be used to find sections of music that will act as substitutes for other sections of music. First one would attempt to substitute one random section from an available collection. If a successful match is found, an identification of this substitute section is placed in a dictionary for later retrieval. Because the number of different watermark values is finite, after sufficient effort a dictionary will be constructed that can be used to substitute music from the collection for parts of a CD that are not present.

Any of a number of techniques, common in the art, can be used to access the dictionary for a given data set. For example, in the example of a CD data set, programs such as CDDB ("CD Data Base") are commonly available to identify the title and performer of each song on the CD, and the like. When a section request appears, the system of this invention can determine which album-section is being requested and replace it with an appropriate substitute.

FIG. 1 illustrates a potential use of this collection of authentic watermarked segments 110 and the determined list 120 of watermarks corresponding to each segment of a watermarked data set to overcome a copy protection scheme based on watermarks.

In the example of FIG. 1, a rendering device 170 is configured to request sequential segments of content material to be rendered to the providing system, via a security device 160. Generally, the providing system is, for example, a CD player that contains an authorized copy of a CD, and the requested sequential segment correspond to the song that is to be rendered. In the security system of the aforementioned copending application, the security device 160 is configured to request the sequential segments from the providing system, and also to select segments from other songs on the CD, to verify that these other segments are also present at the providing system. By verifying the presence of other songs from the CD, the security device 160 verifies, to some degree of confidence, that the complete CD is present.

Alternatively, the system may be configured such that the providing system provides sequential segments directly to the security device 160 for forwarding to the rendering device 170, without requests from the rendering device. In this alternative arrangement, the security device 160 initiates requests for select segments of other songs on the CD to the providing system upon receipt of the unsolicited sequential segments from the providing system.

The example providing system 100 of this invention is configured to provide the watermarked segments 130 of desired material that has been ripped from a CD, and to satisfy segment requests for other material that had been on the CD from a collection of authentic watermarked segments 110 that have been previously downloaded by the user of the providing system 100.

The interface 150 receives the segment request 161 from the security device 160, and determines whether the segment corresponds to a segment in the ripped watermarked segments 130. If the requested segment 161 is not contained in the ripped watermark segments 130, the interface 150 forwards the segment request 161 to a substitution device 140. The substitution device 140 determines the corresponding watermark for the requested segment 161, based on a 'dictionary' 120 that maps segment numbers to watermarks for the current content material. The substitution device 140 then retrieves an authentic watermarked segment corresponding to the requested segment request from the collection 110 of previously downloaded authentic watermarked segments. Note that the substituted watermarked segment from the collection 110 is not the segment that the security device 160 expects, in that it does not belong to the same data set as the ripped watermarked segments 130. However, because the substituted watermark and associated segment from the collection 110 has a duplicate watermark identifier, the security device 160 will conclude that it is the proper watermarked segment. Thus, the providing system will overcome the intended protection provided by the security device 160.

In a preferred embodiment of this invention, the downloaded ripped, and authentic, watermarked segments 130 are added to the collection 110 of previously downloaded authentic watermarked segments, thereby facilitating subsequent substitutions for other data sets.

Note that the dictionary, or mapping, 120, and the collection 110 need not be exhaustive to successfully overcome the intended protection provided by the security device 160. The security device 160 is typically configured to randomly sample the data set, to determine with some degree of confidence that the entire data set is present. Thus, the likelihood of an incomplete mapping 120 or collection 110 successfully overcoming the intended protection is dependent upon the likelihood that the security device will select a segment that is not included in either the mapping 120 or the collection 110. Thus, a providing system 100 of this invention may initially have a low success rate, but, with continued downloading of authentic watermarked segments, will continually increase its success rate.

Figure 2:
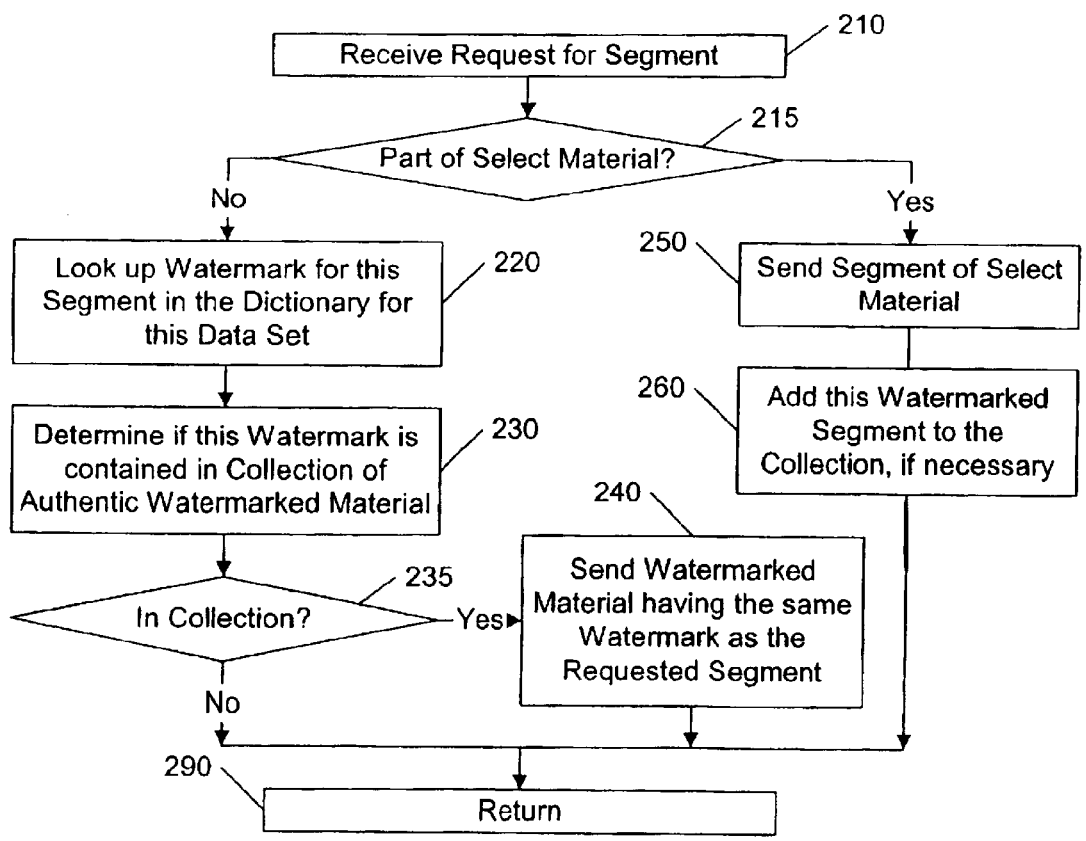
FIG. 2 illustrates an example flow diagram of a system that is configured to overcome a security procedure based on watermarks, in accordance with this invention.

FIG. 2 illustrates an example flow diagram of a system that is configured to overcome a security procedure based on watermarks in accordance with this invention. In this example, a user is assumed to have a subset of a data set, such as a downloaded song from an Internet site, and has selected this subset of the data set for presentation to a rendering device. The rendering device includes a security system that is configured to prevent the rendering of the select material if it can be shown that the user does not possess an entirety, or a substantial majority, of the data set.

The rendering system communicates a request for a particular segment of the data set, which is received by the substitution system of this invention, at 210. As noted above, the security system of the rendering system is designed to verify the presence of the entirety of a data set, and does so by requesting select segments of the data set, including segments beyond those of the material that is selected for rendering. If the requested segment is not part of the selected material, that is, not part of the material that was 'ripped' from the data set and downloaded to the user system, the substitution system accesses a dictionary that identifies the watermark that is associated with the requested segment, at 220. The substitution system then determines whether an authentic watermarked segment having this particular watermark is present in a collection of watermarked segments, at 230. If, at 235, a watermark segment having the appropriate watermark value is available in the collection, it is sent to the rendering system as the requested segment, at 240.

As is common in the art, a watermark verification system is configured to read a watermark from a segment of content material, and to then verify that the watermark has not been damaged, or modified, and to then verify that the information value of the watermark corresponds to a particular value. In the sample substitution system of this invention, the segments in the collection are segments that have authentic watermarks that have not been modified, and therefore the security system is overcome merely by providing segments that have the proper watermark value. Because the requested segment is not part of the material that has been selected for rendering, providing a bogus segment that merely has the appropriate watermark value has no effect on the rendering of the requested material.

If, at 215, the requested segment is part of the material that is selected for rendering, the requested segment is sent to the rendering system. Because the segment that is sent to the rendering system does correspond to the requested material, the rendering of the requested segment by the rendering system will provide the intended result. That is, if the select material is a song from a CD, providing the segments of the song from the select material that was ripped from the CD will result in the select song being rendered.

To increase the likelihood of a requested watermark being available in the user's collection of watermarks, the substitution system is configured to add the segments from the select material to the collection, if the watermark of this segment is not already contained in the collection, at 260. Alternatively, all segments of the latest ripped material may be stored in the collection, replacing or augmenting prior segments that have the same watermark, so as to vary the response of the substitution system to subsequent requests for the same watermark.

If, at 235, the requested segment is not part of the material that is selected for rendering, and the appropriate watermarked segment is not available from the collection, the substitution system either ignores the request, as illustrated in FIG. 2, or may provide a segment with an erroneous watermark. If the security system is configured to allow for some degree of error in the watermarking process, returning a segment with an erroneous watermark may increase the likelihood of the substitution system of this invention overcoming the security system of the rendering system.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention has been presented as a system that includes a predefined dictionary 120, the dictionary 120 for each particular data set may be downloaded at the same time that the ripped segments of the data set are downloaded. That is, the download of a selected song may include the watermarks of the segments before and after the selected song on the original CD. This set of watermarks, and the watermarks of the selected song, form the dictionary 120 for this CD. These and other system optimization and configuration options will be evident to one of ordinary skill in the art in view of this disclosure, and thus are within the spirit and scope of the following claims

I claim:

1. A method of overcoming a watermark security system, comprising:

receiving a request for a requested segment of a plurality of segments that comprises a data set, determining that said requested segment is not included in a select subset of segments to be rendered of the plurality of segments that comprise the data set;

locating a substitute segment from a collection of substitute segments, the substitute segment having a watermark that contains a watermark value that is associated with the requested segment, and communicating the substitute segment in response to the request for the requested segment.

2. The method of claim 1, wherein locating a substitute segment includes determining the watermark value that as associated with the requested segment.

3. The method of claim 1, further including communicating the requested segment in response to the request when the requested segment is within the select subset.

4. The method of claim 3, further including adding segments of the select subset to the collection of substitute segments.

5. The method of claim 1, further including receiving a dictionary of the data set that identifies each watermark value corresponding to each segment of the plurality of segments comprising the data set, to facilitate determining the watermark value that is associated with the requested segment.

6. The method of claim 1, wherein said collection of substitute segments is in addition to said select subset of segments.

7. A substitution system, comprising:

an interface that is configured to:

receive a request for a requested segment of a plurality of segments comprising a data set, determining that said requested segment is not included in a select subset of segments to be rendered of the plurality of segments that comprise the data set, and forward the requested segment to a substitution device;

a dictionary that is configured to provide a watermark value corresponding to the requested segment, and the substitution device, operably coupled to the interface and to the dictionary, that is configured to provide a substitute segment from a collection of watermarked segments in response to the request when said requested segment is not within in a selected subset of segments of the plurality of segments comprising the data set, wherein the substitute segment includes a watermark that has the watermark value corresponding to the requested segment.

8. The substitution system of claim 7, wherein the interface is further configured to provide the requested segment from the select subset of segments, when the requested segment is within the select subset.

9. The substitution system of claim 8, wherein the substitution system is further configured to add segments of the select subset of segments to the collection of watermarked segments.

10. The substitution system of claim 7, wherein the dictionary is further configured to receive a mapping of each watermark value corresponding to each segment of the plurality of segments comprising the data set, to facilitate a determination of the watermark value corresponding to the requested segment.

11. The substitute system of claim 7, wherein said substitute segment is in addition to said select subset of segments.

12. A computer program that, when executed on a computing system, is configured to facilitate the following operations:

receiving a request for a requested segment of a plurality of segments that comprises a data set, locating a substitute segment from a collection of substitute segments, the substitute segment having a watermark that contains a watermark value that is associated with the requested segment, and communicating the substitute segment in response to the request for the requested segment when said requested segment is not within in the selected subset of segments.

13. The computer program of claim 12, wherein the computer program further facilitates:

determining the watermark value that is associated with the requested segment.

14. The computer program of claim 12, wherein the computer program further facilitates:

communicating the requested segment in response to the request when the requested segment as within the select subset.

15. The computer program of claim 14, wherein the computer program further facilitates:

adding segments of the select subset to the collection of substitute segments.

16. The computer program of claim 12, wherein the computer program further facilitates receiving a dictionary of the data set that identifies each watermark value corresponding to each segment of the plurality of segments comprising the data set, to facilitate determining the watermark value that is associated with the requested segment.

17. The computer program of claim 12, wherein said substitute segment is in addition to said select subset of segments.

18. A method of creating a dictionary of substitute segments for overcoming a watermark security system, the method comprising:

receiving a request from the watermark security system for a select segment of a data set that includes a plurality of segments, determining that said select segment is not included in a select subset of segments to be rendered of the plurality of segments that comprise the data set, providing a substitute segment from a collection of substitute segments when said select segment is not within said select subset of segments, determining whether the substitute segment is acceptable to the watermark security system, associating the substitute segment to the select segment of the data set, if the substitute segment is acceptable to the watermark security system.

19. The method of claim 18, wherein the dictionary is configured to contain a set of associations of substitute segments for the plurality of segments of the data set.

20. The method of claim 18, wherein said substitute segment is in addition to said select subset of segments.

21. A method of overcoming a watermark security system of a rendering system for rendering selected material from content material of a data set, said content material including a plurality of watermarked segments, said method comprising:

requesting a requested segment of said plurality of watermarked segments to verify authenticity of at least one of said plurality of watermarked material included in said requested segment;

determining that said requested segment is not included in said selected material, obtaining said at least one of said plurality of watermarked segments from a collection of substitute segments included in said watermark security system when said requested segment is not included in said selected material; and obtaining said at least one of said plurality of watermarked segments from said requested segment when said requested segment is included in said selected material.

22. The method of claim 21, wherein said substitute segments have watermarks that contain watermark values that are associated with said watermarked segments of said content material of said data set.

23. The method of claim 21, wherein said substitute segment is in addition to said select subset of segments.

24. A method of verifying content watermarks included in content material having a portion of said content material available to a watermark security system, said method comprising:

requesting a requested watermark of said watermarks; and determining that said requested watermark is not included in said portion; and obtaining said requested watermark from a collection of substitute watermarks included in said watermark security system when said requested watermark is not included in said portion.

25. The method of claim 24, further comprising obtaining said requested watermark from said portion when said requested watermark is included in said portion.

26. The method of claim 24, wherein said collection of substitute watermarks is in addition to embedded watermarks in said portion of said content material.

* * * * *